J. D. A. JOHNSON.
WASHING MACHINE.
APPLICATION FILED FEB. 24, 1914.
1,252,808.
Patented Jan. 8, 1918.
2 SHEETS—SHEET 1.
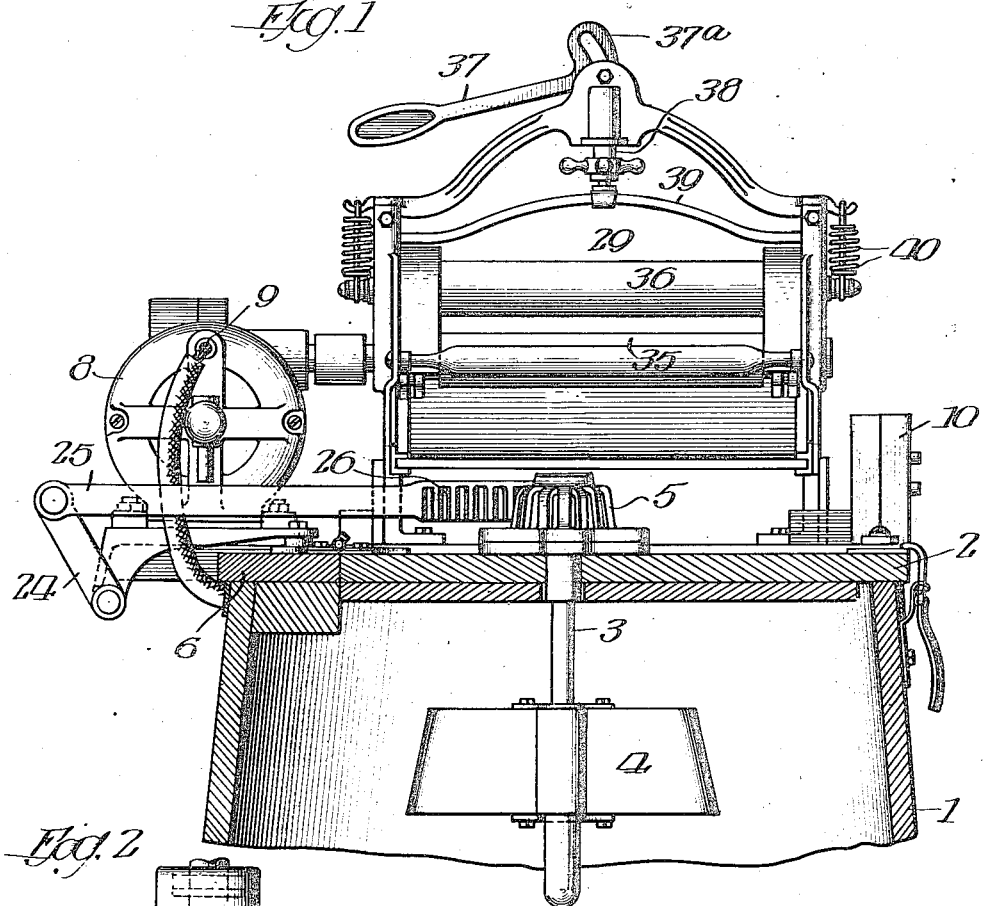
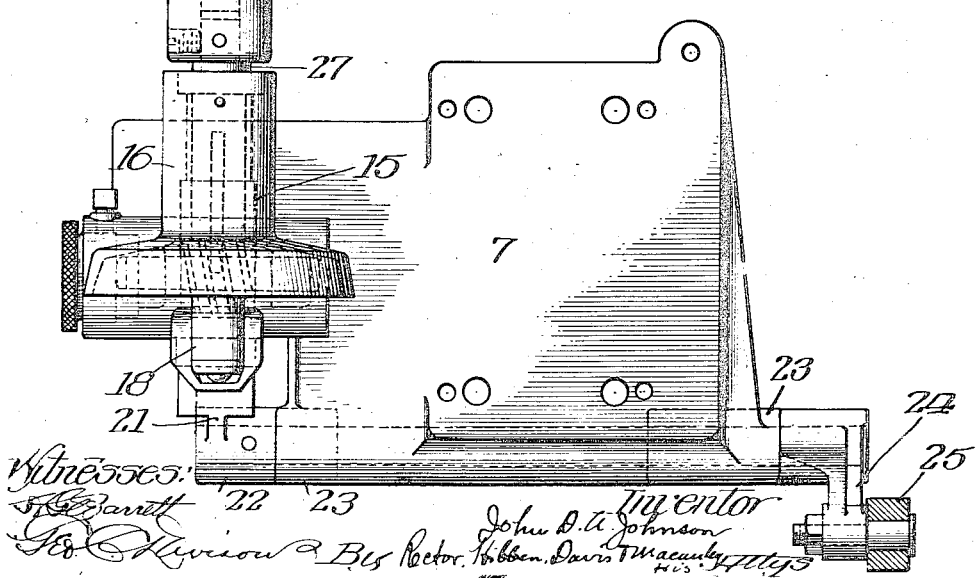

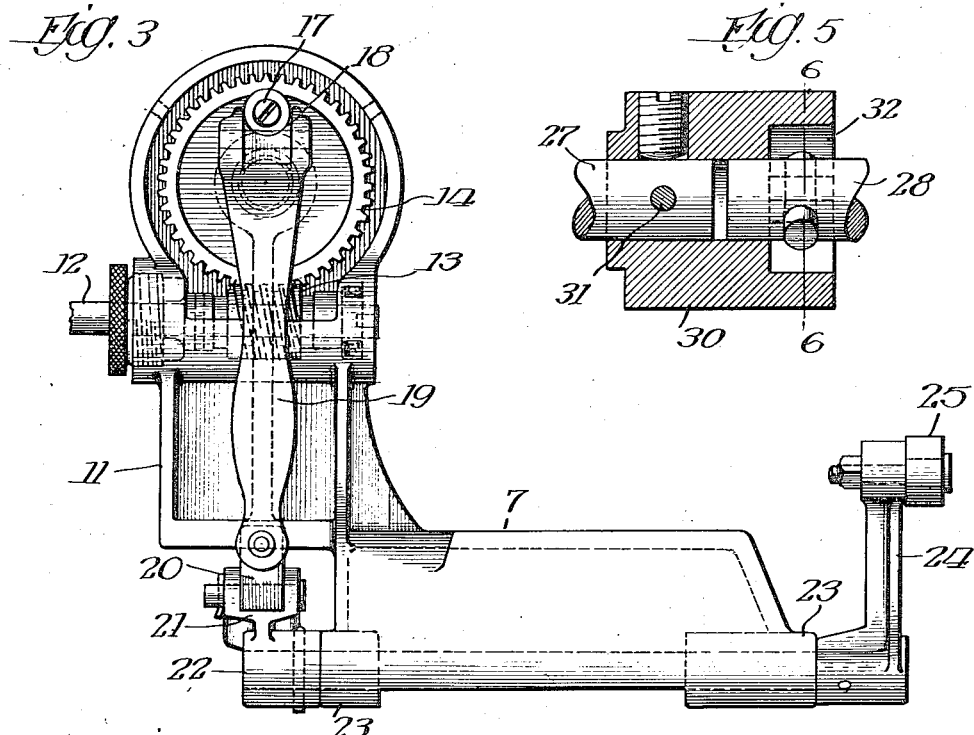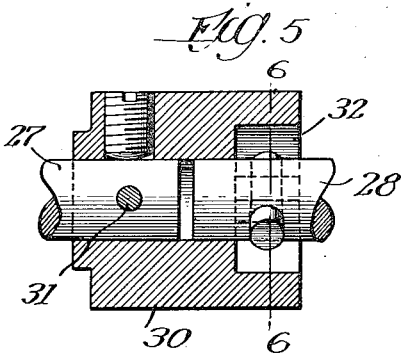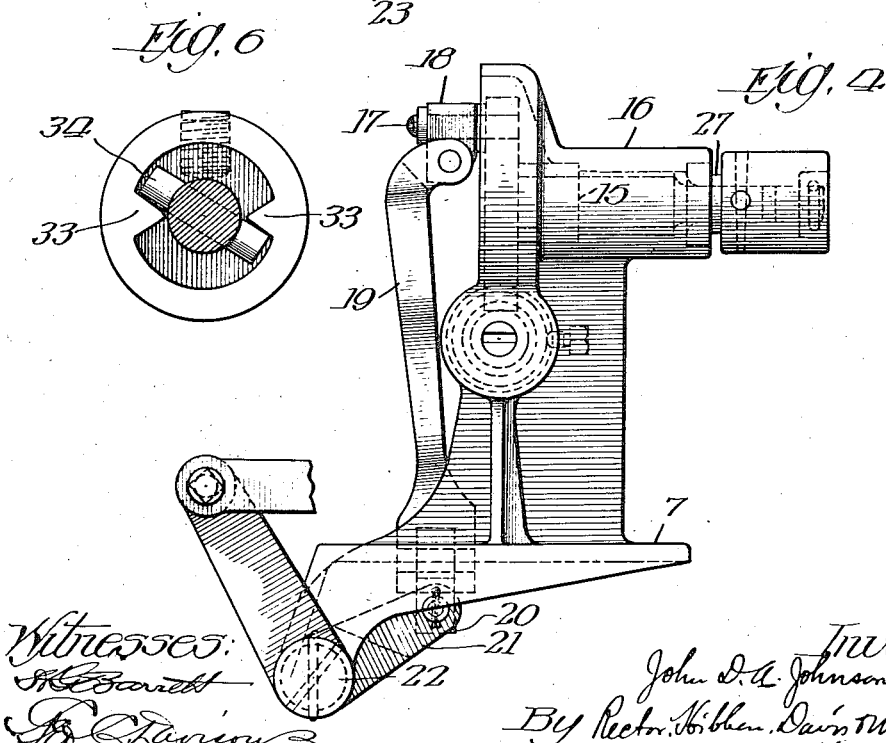

UNITED STATES PATENT OFFICE.

JOHN D. A. JOHNSON, OF MUSKEGON, MICHIGAN.

WASHING-MACHINE.

1,252,808. Specification of Letters Patent. Patented Jan. 8, 1918.

Application filed February 24, 1914. Serial No. 820,593.

*To all whom it may concern:*

Be it known that I, JOHN D. A. JOHNSON, a citizen of the United States, residing at Muskegon, Muskegon county, Michigan, have invented certain new and useful Improvements in Washing-Machines, of which the following is a specification.

My invention relates to washing machines and the object thereof is to provide a simple and efficient drive between the prime mover such as an electric motor and the agitating device or dolly contained within the tub or washing receptacle and between such motor and a wringer mounted upon such tub. Various features of advantage and utility in a machine embodying my invention will be apparent from the description hereinafter given.

In the drawings, Figure 1 is a sectional elevation of the upper portion of a tub or receptacle with the driving connections and wringer shown mounted thereupon; Fig. 2 a plan view of the supporting plate which supports the motor and driving mechanism, the motor being shown removed, and likewise the cap covering the worm gear being removed; Fig. 3 an elevation of the part shown in Fig. 2; Fig. 4 an end view thereof; Fig. 5 a section on the line 5—5 of Fig. 2; and Fig. 6 a section on the line 6—6 of Fig. 5.

Referring to the particular embodiment of my invention as herein shown, the washing machine tub or receptacle 1 may be of the usual construction and provided with the usual pivoted lid 2 in which is pivotally supported a vertically driven shaft 3 for the agitating device or dolly 4 contained within the tub or receptacle. This shaft is provided at its upper end with a gear 5 which is driven by the mechanism hereinafter described.

Upon the top stationary board or plate 6 of the tub is mounted a supporting plate 7 having the general shape and dimensions as illustrated more particularly in Figs. 2, 3 and 4. This plate forms the support of the prime mover which is in the present instance an electric motor provided with the supply cables 9 communicating with a suitable button switch 10 arranged at the opposite sides of the machine, as shown in Fig. 1. At one end of this plate there rises from the top surface thereof a bracket 11 in which are formed bearings for a short horizontal shaft 12 whose inner end is adapted to be coupled to and driven by the armature shaft of the electric motor. At its middle portion this shaft is provided with a worm 13 adapted to mesh with a worm gear 14 having a hub 15 bearing in the tubular bearing sleeve 16 of the bracket. This worm gear is provided with a crank pin on which is pivotally arranged a bearing block 18 to whose opposite sides is pivotally secured the upper bifurcated end of a connecting rod 19. This rod is connected at its lower end to a bearing block 20 which is pivotally connected with a crank arm 21 secured to a horizontal shaft 22. This shaft is a rock shaft journaled in the bearing portions 23 at the front corners of the plate 7. At its right-hand end, Fig. 2, this shaft is provided with a crank arm 24 to whose outer end is pivotally connected a rack bar 25 whose outer free end is provided with a rack 26 meshing with and driving the gear 5. This rack bar is so constructed that it may be swung bodily out of mesh and alongside of the tub or receptacle.

The worm gear 14 is connected to a short horizontal shaft 27 which is coupled to the driven shaft 28 of the wringer 29 in a peculiar manner now to be described. A coupling sleeve 30 is rigidly secured to the shaft 27 in suitable manner as by means of the pin 31 but this sleeve is not rigidly connected with the other shaft 28 but is so connected therewith that there shall be a lost motion or play between the sleeve 30 and the shaft 28. The purpose of this arrangement is to provide for a speeding up or starting movement of the motor before it received the dead load of the wringer. In the present instance I accomplish these results by providing the coupling sleeve with an enlarged opening 32 at that end in which the shaft 28 passes. This opening or socket is circular except for the two opposite inwardly extending projections 33 which are adapted to coöperate with the ends of the pin 34 extending diametrically through the shaft 28. It will be understood that in either the direct or reverse movement of the driving shaft 27 the coupling sleeve 30 will have an independent movement until the pin 34 strikes the projections 33 at which time the wringer will be driven.

The shaft 28 is connected with the lower roller 35 and the upper roller 36 is adapted to be moved downwardly by the operating handle 37 which by means of its cam face 37ª forces the plunger 38 downwardly. This plunger is connected to the cross bar 38 which in turn is connected with the ends of the upper roller 36. This roller is depressed in the manner stated against the tension of the coiled springs 40 which serve to raise the upper roller whenever the operating handle 37 is swung to the position shown in Fig. 1.

The switch device indicated at 10 co-operates with the motor and includes means for interrupting the current, that is opening and closing the circuit, and also means for reversing the direction of the current to thereby reverse the direction of rotation of the motor, and consequently the direction of drive of the wringer.

The mechanism hereinbefore described is simple and inexpensive of manufacture and is nevertheless efficient for its purposes and not liable to get out of order or to become broken in usage.

I claim:

1. The combination of a reciprocating driving bar, a rock shaft operatively connected therewith, a worm wheel, a connecting rod operatively connected with the wheel and rock shaft, a worm operating the wheel, and a prime mover for actuating the worm.

2. The combination, with a supporting plate, of a driving bar, a rock shaft journaled in the plate and operatively connected with the bar, a gear also journaled in the plate, means for operatively connecting the gear and rock shaft, and a prime mover mounted upon the plate for actuating the gear.

3. The combination, with a supporting plate having a vertical bracket, a driving bar, a rock shaft journaled in the plate and operatively connected with the bar, a gear journaled in the bracket, means for operatively connecting the gear and rock shaft and a prime mover mounted upon the plate for actuating the gear.

4. The combination, with a supporting plate having a vertical bracket, a driving bar, a rock shaft journaled in the plate and operatively connected with the bar, a worm wheel journaled in the upper end of the bracket, a worm journaled in the intermediate portion of the bracket and arranged to drive the wheel, and a motor supported upon the plate and arranged to drive the worm.

5. The combination with a supporting plate provided along one side with bearings, a driving bar, a rock shaft journaled therein and operatively connected with the bar, a gear journaled on the plate and operatively connected with the shaft and a motor mounted on the plate and arranged to drive the gear.

6. The combination of a reciprocating driving bar, a rock shaft having a crank arm operatively connected with the bar, a worm wheel, a connecting rod operatively connected at one end with the wheel, a crank arm connected with the other end and with the rock shaft, a worm for operating the wheel, and a motor for actuating the worm.

7. The combination of a supporting plate having a bracket, a reciprocating driving bar, a rock shaft operatively connected therewith and journaled in the plate, a gear journaled in the bracket and having a crank pin, a bearing block on the pin, a connecting rod pivotally connected at one end with the block, a crank arm on the rock shaft, a bearing block thereon pivotally connected with the other end of the connecting rod, and a motor for actuating the gear.

8. The combination of a supporting plate having a bracket, a reciprocating driving bar, a rock shaft journaled in the plate and operatively connected with the bar, a gear journaled in the bracket and operatively connected with the rock shaft, a motor on the plate for driving the gear, a driving shaft connected with the gear, a driven gear, and a coupling between the shafts with a lost motion.

JOHN D. A. JOHNSON.

Witnesses:
OTTO ALBERT BURANDT,
JOSEPH ROCK.